United States Patent
Paetow et al.

(10) Patent No.: US 9,861,843 B2
(45) Date of Patent: Jan. 9, 2018

(54) BRACKET FOR A FIRESTOP COLLAR AND USE OF THIS BRACKET

(71) Applicants: Mario Paetow, Igling (DE); Rudolf Semler, Prittriching (DE)

(72) Inventors: Mario Paetow, Igling (DE); Rudolf Semler, Prittriching (DE)

(73) Assignee: Hilti Aktiengesellschaft, Schaan (LI)

( * ) Notice: Subject to any disclaimer, the term of this patent is extended or adjusted under 35 U.S.C. 154(b) by 702 days.

(21) Appl. No.: 13/623,150

(22) Filed: Sep. 20, 2012

(65) Prior Publication Data

US 2013/0086856 A1 Apr. 11, 2013
US 2017/0128757 A9 May 11, 2017

(30) Foreign Application Priority Data

Oct. 5, 2011 (DE) .......................... 10 2011 084 057

(51) Int. Cl.

| | |
|---|---|
| *E04C 2/00* | (2006.01) |
| *A62C 2/06* | (2006.01) |
| *F16L 5/04* | (2006.01) |
| *F16L 3/123* | (2006.01) |
| *H02G 3/04* | (2006.01) |

(52) U.S. Cl.
CPC .............. *A62C 2/065* (2013.01); *F16L 3/123* (2013.01); *F16L 5/04* (2013.01); *H02G 3/0412* (2013.01)

(58) Field of Classification Search
CPC . A62C 2/065; F16L 5/04; F16L 3/123; H02G 3/0412
USPC ............................................................ 52/232
See application file for complete search history.

(56) References Cited

U.S. PATENT DOCUMENTS

| | | | | |
|---|---|---|---|---|
| 4,221,092 | A | * | 9/1980 | Johnson ........................... 52/232 |
| 4,538,389 | A | * | 9/1985 | Heinen ........................ 52/220.8 |
| 4,850,385 | A | * | 7/1989 | Harbeke ........................... 137/75 |
| 5,103,609 | A | * | 4/1992 | Thoreson et al. ............... 52/232 |
| 5,105,592 | A | * | 4/1992 | MacMillan et al. ............ 52/232 |
| 5,155,957 | A | * | 10/1992 | Robertson et al. .............. 52/232 |
| 5,347,767 | A | * | 9/1994 | Roth .................................... 52/1 |
| 5,452,551 | A | * | 9/1995 | Charland et al. ................ 52/232 |
| 5,887,396 | A | * | 3/1999 | Thoreson ......................... 52/232 |
| 5,970,670 | A | * | 10/1999 | Hoffman .......................... 52/232 |
| 6,029,412 | A | * | 2/2000 | Gohlke ............................ 52/232 |
| 6,725,615 | B1 | * | 4/2004 | Porter .............................. 52/232 |
| 7,082,730 | B2 | * | 8/2006 | Monden et al. ................. 52/232 |
| 8,024,900 | B2 | * | 9/2011 | Cordts .......................... 52/220.8 |
| 8,029,345 | B2 | * | 10/2011 | Messmer et al. .............. 454/284 |
| 8,146,305 | B2 | * | 4/2012 | Cordts .......................... 52/220.8 |
| 8,393,121 | B2 | * | 3/2013 | Beele ........................... 52/220.8 |

(Continued)

FOREIGN PATENT DOCUMENTS

| | | |
|---|---|---|
| DE | 8808393 U1 | 10/1988 |
| DE | 198 52 120 | 3/2000 |

(Continued)

*Primary Examiner* — Brian Glessner
*Assistant Examiner* — Joshua Ihezie
(74) *Attorney, Agent, or Firm* — Davidson, Davidson & Kappel, LLC

(57) ABSTRACT

The anchoring element serves to anchor the bracket to a substrate, and the pressure element is intended to interact with the firestop collar. The pressure element can be moved relative to the anchoring element. An expansion element made of intumescent material is arranged between the anchoring element and the pressure element.

1 Claim, 6 Drawing Sheets

(56) References Cited

U.S. PATENT DOCUMENTS

| | | | | |
|---|---|---|---|---|
| 2002/0056242 | A1* | 5/2002 | Andresen | 52/220.8 |
| 2004/0149390 | A1* | 8/2004 | Monden et al. | 156/391 |
| 2008/0078841 | A1* | 4/2008 | Messmer et al. | 236/49.3 |
| 2011/0302860 | A1* | 12/2011 | Cordts | 52/232 |
| 2013/0061545 | A1* | 3/2013 | Van Walraven et al. | 52/232 |
| 2013/0086857 | A1* | 4/2013 | Paetow et al. | 52/232 |

FOREIGN PATENT DOCUMENTS

| | | |
|---|---|---|
| DE | 201 10 973 | 8/2001 |
| DE | 102 17 174 | 10/2003 |
| DE | GB 2388174 | 11/2003 |
| DE | 103 05 903 | 8/2004 |
| DE | 20 2006 004 488 | 5/2006 |
| DE | 20 2006 019 593 | 4/2007 |
| DE | 10 2008 031 018 | 7/2009 |
| DE | 10 2008 059 564 | 6/2010 |

* cited by examiner

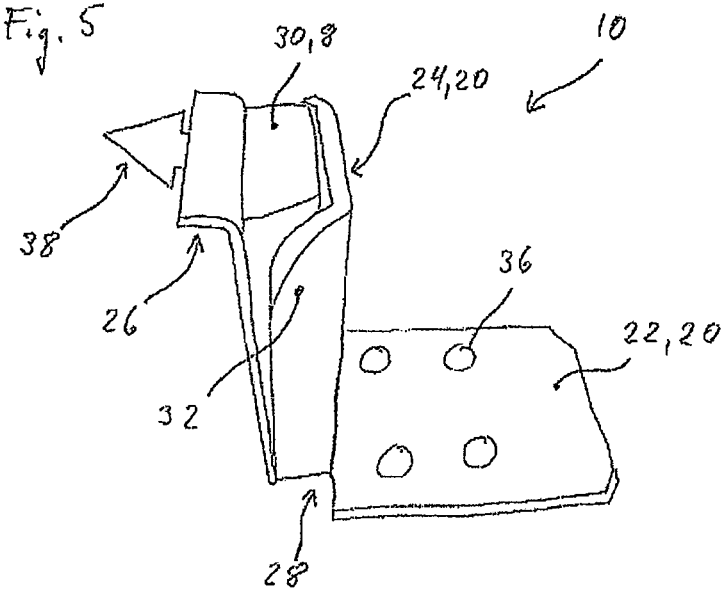
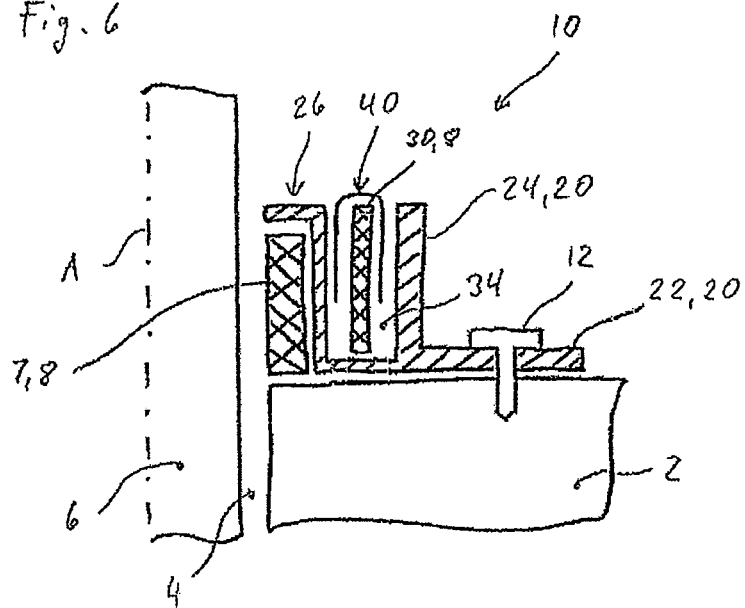

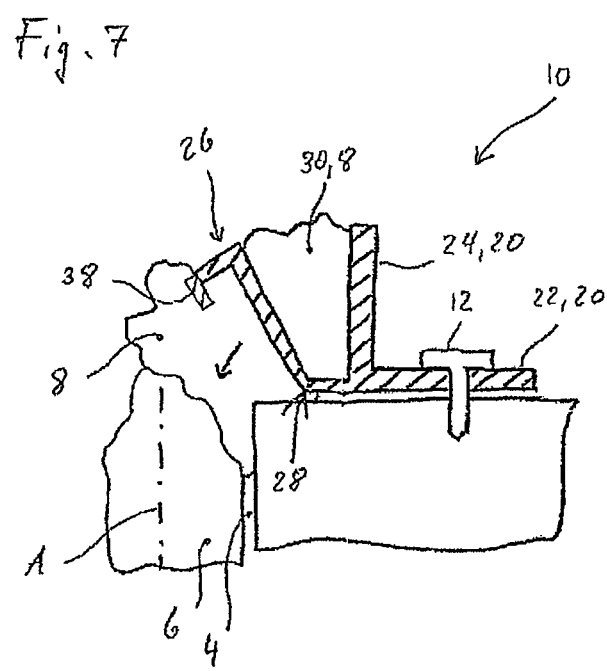

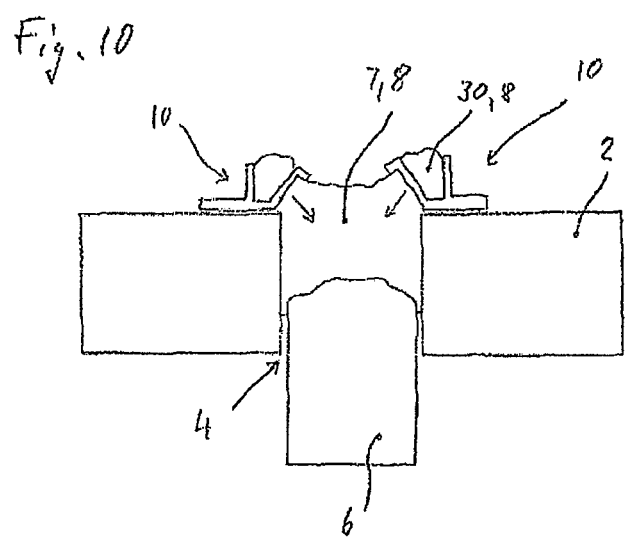

BRACKET FOR A FIRESTOP COLLAR AND USE OF THIS BRACKET

This claims the benefit of German Patent Application DE 10 2011 084 057.5, filed Oct. 5, 2011 and hereby incorporated by reference herein.

The present invention relates to a bracket for a firestop collar as well as to the use of this bracket as fastening material for a firestop collar.

BACKGROUND

A firestop collar arranged around pipes or cables comprises intumescent material that expands upon exposure to heat, closing off the penetration as tightly as possible so as to prevent propagation of the fire. Depending on the diameter of the penetration, the firestop collar can be arranged on an outer end of the penetration, for example, on the wall or floor/ceiling, or else directly in the penetration. When the firestop collar is arranged at the entrance to the penetration, it is normally fastened to the wall or floor/ceiling by means of brackets.

This situation is shown by way of an example in FIG. 1. A wall 2 has a penetration 4 through which a pipe 6 runs that extends along the longitudinal axis A. A firestop collar 7 which is, for instance, a fabric collar made of an intumescent material 8 wrapped with a fabric 9 surrounds the pipe 6 at the entrance of the penetration 4 in the circumferential direction. The firestop collar 7 is fastened by means of a bracket 10. The bracket is fastened to the wall 2 with a screw 12 and it comprises a fastening section 14 that is in contact with the wall 2 as well as a support section 16 that is in contact with the firestop collar 7.

FIG. 2 shows a schematic top view of a firestop collar 7 mounted on several brackets 10. The support sections 16 of the bracket 10 are additionally provided with claws 18 that affix the firestop collar 7. In case of fire, the intumescent material 8 expands in the direction of the pipe 6 (indicated by arrows). This prior-art arrangement, however, entails the problem that some of the intumescent material 8 widens in the axial direction (that is to say, essentially parallel to the longitudinal axis A of the pipe 6) and is squeezed out at the opening of the penetration 4 on the wall side. As a result, intumescent material is lost and is then not available to close off the penetration 4. A correspondingly large quantity of intumescent material 8 is normally employed in order to remedy this problem.

SUMMARY OF THE INVENTION

It is an object of the present invention to provide a bracket for a firestop collar that allows the firestop collar to be used efficiently.

As set forth in the invention, the term "firestop collar" comprises every type of wrapping of a pipe with intumescent material, such as a fabric collar, which is a strip of intumescent material that is wrapped with a fabric strip, a firestop bandage or a firestop strip. This list is provided by way of an example and should not be construed in any limiting manner.

The present invention provides a bracket for a firestop collar, comprising an anchoring element and a pressure element. The anchoring element is fastened to a substrate in order to anchor the bracket. The pressure element is intended to interact with the firestop collar. The pressure element can be moved relative to the anchoring element, whereby an expansion element made of intumescent material is arranged between the anchoring element and the pressure element. The bracket according to the invention is based on the fundamental notion of actively moving the firestop collar in case of fire in the direction of a penetration present in the substrate. The bracket is particularly well-suited for fabric collars that are employed as firestop collars, although it is not restricted to such firestop collars. For example, they can also be flexibly deformable strips or bandages with intumescent material. The bracket according to the invention can be used for any firestop collars that are soft and flexible enough to be pressed by the intumescence pressure of the expansion element towards the penetration that is to be closed off. The systematic deformation of the firestop collar allows its intumescent material to be directed towards the penetration. Consequently, the intumescent material is utilized effectively and a smaller amount can be used in the firestop collar, which translates into cost savings. Furthermore, a more compact and thus more reliable closure is obtained since the expansion is directed into the opening that is to be closed off.

According to one embodiment, the pressure element of the bracket is pivotably joined to the anchoring element. Advantageously, these two elements can be joined to each other in such a way that a free end of the pressure element can be pivoted in the direction of the penetration. This pivoting movement causes the intumescent material of the firestop collar to be directed towards the penetration.

Preferably, the anchoring element has at least a first leg and a second leg. The first leg can be provided to fasten the anchoring element to the substrate, and the pressure element can be arranged on the second leg of the anchoring element.

Moreover, according to one embodiment, a pivoting axis around which the pressure element can be pivoted relative to the anchoring element can be arranged in a transition area between the first leg and the second leg.

Preferably, the anchoring element has two L-shaped legs.

Moreover, the pressure element can be pivotably joined to the anchoring element by means of a bending section. Such a bracket can be manufactured particularly cost-effectively.

According to one embodiment of the invention, the pressure element of the bracket is a sheet metal tab that can also be provided with at least one hook. This hook is provided for the purpose of interacting with the firestop collar. Therefore, as an alternative, a mandrel, a claw or another means having an equivalent function can also be employed in order to secure the firestop collar.

According to another embodiment, the expansion element is arranged in a pocket situated between the pressure element and the anchoring element. This pocket prevents the intumescent material of the pressure element from being squeezed out at the sides. In this manner, the intumescence pressure brought to bear by the expansion element can be effectively converted into a pivoting movement of the pressure element.

According to another embodiment, the pocket is formed by the anchoring element and the pressure element. In this context, the anchoring element or the pressure element can be provided with side tabs that extend in the direction of the pressure element or of the anchoring element. This makes it possible to manufacture the pocket particularly inexpensively.

In order to use the expansion element even more effectively, the pocket (optionally additionally) can be formed by a fabric strip. Advantageously, this pocket can be closed off at a free end of the pressure element. Such a pocket formed by a fabric strip prevents the intumescent material of the expansion element from being squeezed out, especially at a free end of the pressure element. The intumescence pressure built up by the expansion element can be utilized particularly effectively.

According to another aspect of the invention, the bracket according to one or more of the above-mentioned aspects of the invention can be employed as fastening material for a firestop collar or for a firestop bandage. The effects and advantages already mentioned in conjunction with the bracket apply in an identical or similar manner to its use as fastening material for a firestop collar or for a firestop bandage. A firestop bandage can also consist of several windings.

BRIEF DESCRIPTION OF THE DRAWINGS

Additional features and advantages of the invention can be gleaned from the description below of advantageous embodiments making reference to the accompanying drawings. The following is shown:

FIG. 5: a perspective view of a bracket according to a second embodiment, FIG. 6: a schematic sectional view of a bracket according to a third embodiment, FIG. 7: a schematic sectional view of a bracket in an expanded state, according to one embodiment, and FIGS. 8-10: a wall penetration to which a firestop collar is fastened with brackets according to one embodiment, in an initial state, at the beginning of a fire, and after the fire has progressed, whereby the wall penetration is closed off by the firestop collar.

DETAILED DESCRIPTION

Figure 1:
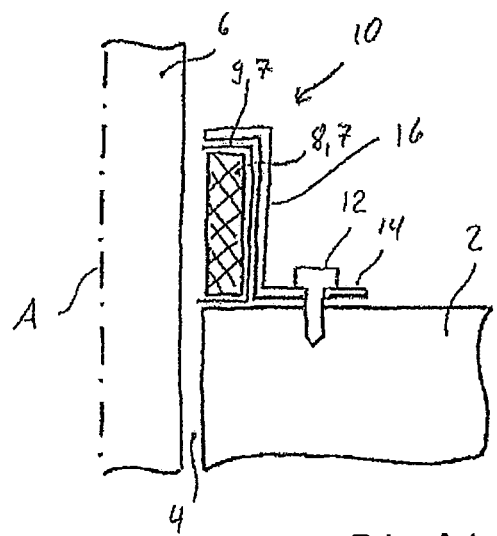
FIG. 1: a schematic sectional view of a bracket for a firestop collar known from the state of the art.
Figure 2:
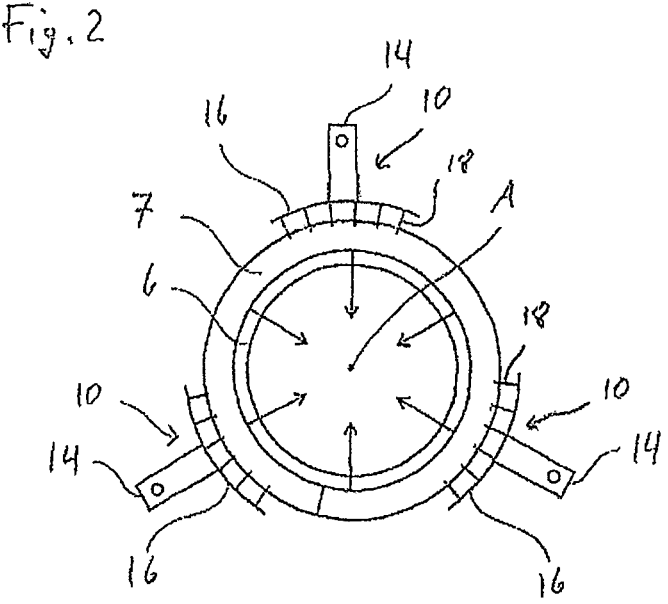
FIG. 2: a schematic top view of a firestop collar of FIG. 1, FIG. 3: a schematic sectional view of a bracket according to a first embodiment of the present invention.
Figure 3:
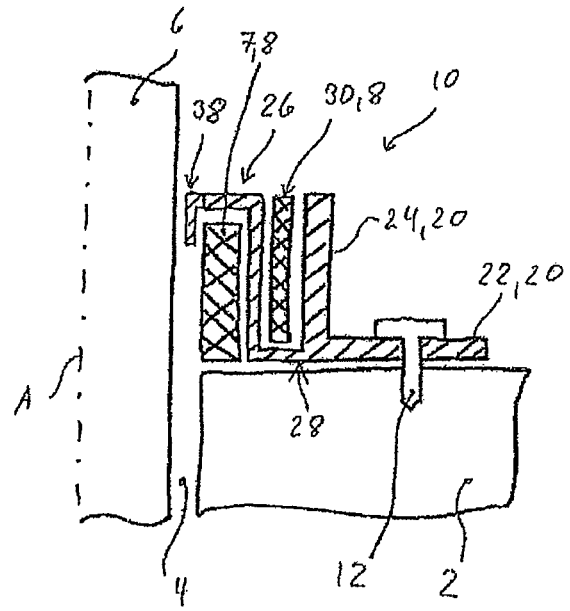

FIG. 3 shows a schematic sectional view of a bracket 10 according to a first embodiment. The bracket 10 comprises an anchoring element 20 that includes a first leg 22 and a second leg 24. The legs 22, 24 are in an L-shaped arrangement with respect to each other. The first leg 22 is fastened to a wall 2 by means of a screw 12 as the fastening element. A pressure element 26 is joined to the anchoring element 20 by means of a bending section 28 in a transition area between the first leg 22 and the second leg 24. As an alternative to the use of the bending section 28, it is also possible for the pressure element 26 and the anchoring element 20 to be pivotably joined to each other in a different manner. The use of a fabric strip or of a simple hinge is conceivable. A pivoting axis around which the pressure element 26 can be moved or pivoted relative to the anchoring element 20 is located in the transition area between the first leg 22 and the second leg 24. Preferably, the pressure element 26 is a sheet metal tab that also comprises a hook 38 that secures a firestop collar 7, of which—for the sake of clarity—only the encompassed intumescent material 8 is shown. The firestop collar 7 has the function of closing off the penetration 4 of the wall 2 in case of fire.

An expansion element 30 that likewise consists of intumescent material 8 is located between the anchoring element 20 and the pressure element 26. Intumescent material having a conventional composition, for instance, active substances such as acidifiers, carbon sources, propellants and physically expandable compounds like expandable graphite, which are bonded in a matrix, especially a polymer matrix, can be used for the firestop collar 7 as well as for the expansion element 30. The expansion element 30 is preferably a flat strip of intumescent material 8, whose first flat side is in contact with the second leg 24 of the anchoring element 20, and whose opposite flat site is in contact with the pressure element 26.

In the case of fire, it is not only the intumescent material 8 of the firestop collar 7 that expands but also the intumescent material 8 of the expansion element 30. The expansion of the expansion element 30 exerts intumescence pressure onto the pressure element 26, as a result of which the latter is pivoted relative to the anchoring element 20. The pivoting movement occurs due to deformation of the bending section 28. As a result of this movement, the firestop collar 7 is pivoted in the direction of the penetration 4. Its intumescent material 8 thus expands not only radially but also axially, that is to say, parallel to the longitudinal axis A of the pipe 6 that might have been destroyed by the fire. The firestop collar 7 is, for example, a fabric collar. However, it is likewise possible to employ other firestop collars 7 such as, for instance, firestop bandages, which can also be multilayered, and which are soft and flexible enough to be deformed by the intumescence pressure caused by the expansion element 30.

Figure 4:
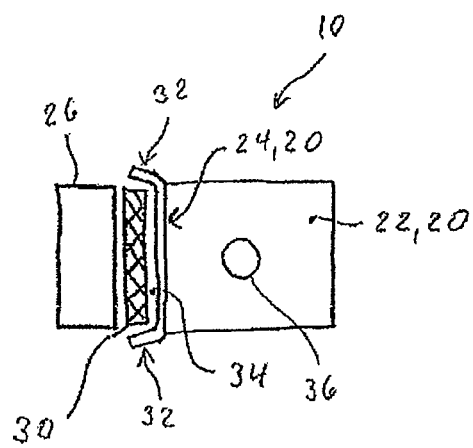
FIG. 4: a schematic top view of this bracket.

In order to be able to build up sufficient intumescence pressure, it is advantageous if the bracket 10, according to another embodiment, has a pocket formed by the anchoring element 20 and the pressure element 26, with the expansion element 30 being arranged in the pocket. FIG. 4 shows a schematic top view of such a bracket 10. The second leg 24 of the anchoring element 20 is provided with side tabs 32 that extend in the direction of the pressure element 26. As an alternative, the pressure element 26 can be provided with side tabs 32 that face the second leg 24 of the anchoring element 20. The side tabs 32 can prevent the expansion element 30 from being squeezed out at the sides, so that a sufficiently high intumescence pressure can build up in the pocket 34.

Furthermore, in an alternative embodiment, the anchoring element 20 or the pressure element 26 can be additionally provided with a head tab (not shown in FIG. 4) which is comparable to one of the side tabs 32 and which extends in the direction of the pressure element 26 or of the anchoring element 20, and which is arranged on the edge of the anchoring element 20 or of the pressure element 26 that is opposite to the wall 2. This head tab can prevent the expansion element 30 from being squeezed out upwards, in other words, away from the floor/ceiling 2, which additionally increases the expansion pressure towards the pressure element 26.

FIG. 5 shows such a bracket 10 in a simplified, perspective view. For purposes of fastening the bracket to a wall or floor/ceiling, the first leg 22 of the anchoring element 20 is provided with preferably stamped fastening openings 36. The bracket 10 can preferably be stamped out of a strip of sheet metal and bent into the desired shape. The pressure element 26 also has a hook 38 that can interact with the firestop collar 7 and that especially can affix it. The hook 38, which alternatively can also be one or more hooks, claws or the like, is preferably pressed into the firestop collar 7 in order to securely fasten it.

FIG. 6 shows a bracket 10 according to another embodiment. The bracket 10 is similar to the bracket 10 shown in FIG. 3. However, as an alternative to the head tab described above, it (additionally) has a fabric strip 40. In the axial direction, this fabric strip 40 restricts the pocket 34 formed between the anchoring element 20 and the pressure element 26. The fabric strip 40 advantageously prevents the intumescent material 8 of the expansion element 30 from being squeezed out in this direction. Especially through interaction with the side tabs 32, it can thus be ensured that a sufficient intumescence pressure can be built up between the anchoring element 20 and the pressure element 26 in case of fire, so that the firestop collar 7 is reliably deformed in the direction of the penetration 4.

FIG. 7 shows another schematic sectional view of a bracket 10 in which the pressure element 26 has been pivoted out of its original position as a result of the action of the fire. The intumescent material of the expansion element 30 has expanded due to the effect of the fire. Consequently, the pressure element 26 was pivoted relative to the anchoring element 20 through deformation of the bending section 28. The intumescent material 8 of the firestop collar has expanded in the direction of the penetration 4 (as indicated by an arrow) and protects the already destroyed pipe 6 against the fire.

Figure 8:
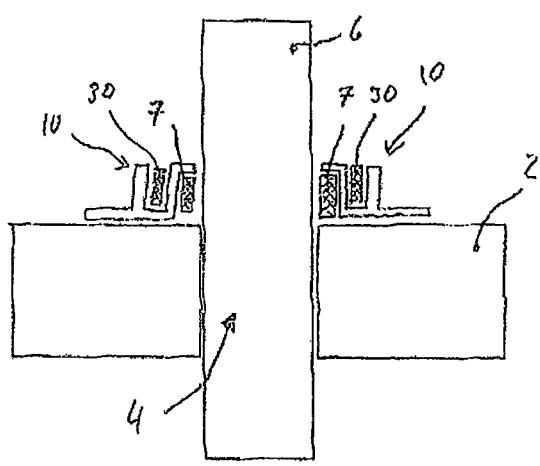
Figure 9:
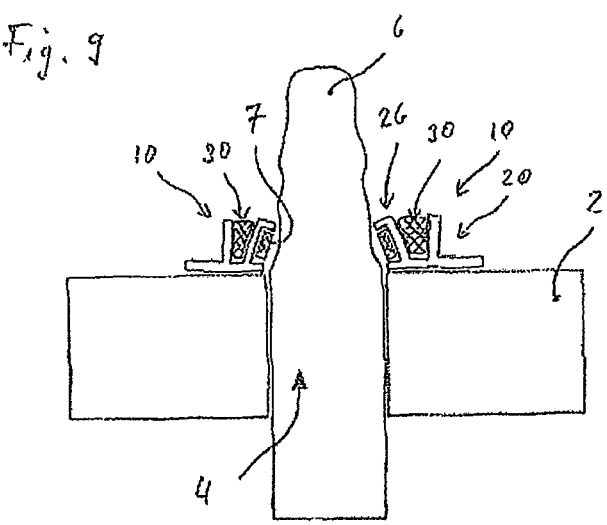

FIGS. 8, 9 and 10 describe the interaction of a bracket 10 according to one of the embodiments with a firestop collar 7 during various stages of the fire. FIG. 8 shows a pipe 6 that extends into a penetration 4 present in a wall 2. It is secured on one side to a firestop collar 7 that is fastened to the wall 2 by means of two brackets 10. The fire destroys the pipe 6 on the side shown at the top; an early stage is shown in FIG. 9. At this stage, the expansion elements 30 of the bracket 10 have already expanded slightly, which has caused the pressure element 26 to have been pivoted relative to the anchoring element 20. Already at this stage of the fire, the firestop collar 7 held by the pressure element 26 of the bracket 10 has clearly pivoted in the direction of the penetration 4.

FIG. 10 shows the views already known from FIGS. 8 and 9 at a later stage of the fire. The intumescent material 8 of the firestop collar 7 has completely closed off the penetration 4 present in the wall 2. The intumescent material 8 has made its way deep into the penetration 4, reliably closing it off. The pipe 6 that was previously situated in the penetration 4 has been largely destroyed. The firestop collar 7 has released a large amount of intumescent material 8 into the penetration 4. The intumescent material 8 of the firestop collar 7 is utilized effectively and can form a compact ash crust. This translates into a long period of fire resistance.

LIST OF REFERENCE NUMERALS 2 wall
4 penetration
6 pipe
7 firestop collar
8 intumescent material
9 fabric
10 bracket
12 screw
14 fastening section
16 support section
18 claw
20 anchoring element
22 first leg
24 second leg
26 pressure element
28 bending section
30 expansion element
32 side tabs
34 pocket
36 fastening openings
38 hooks
40 fabric strips
A longitudinal axis

What is claimed is:

1. A method for providing a firestop collar comprising:
   fastening a firestop collar using a bracket, the bracket comprising:
      an anchor for anchoring the bracket to a substrate;
      a pressure element intended to interact with the firestop collar, the pressure element movable relative to the anchor; and
      an expansion element made of intumescent material arranged between the anchor and the pressure element.

* * * * *